May 20, 1969     F. C. EASTER     3,445,751

CURRENT LIMITING VOLTAGE REGULATOR

Filed Nov. 25, 1966

INVENTOR
Finis C. Easter
Simon Yaffee
(Attorney)

3,445,751
CURRENT LIMITING VOLTAGE REGULATOR
Finis C. Easter, Canoga Park, Calif., assignor to Radio Corporation of America, a corporation of Delaware
Filed Nov. 25, 1966, Ser. No. 596,875
Int. Cl. G05f 3/02
U.S. Cl. 323—9         1 Claim

ABSTRACT OF THE DISCLOSURE

A voltage regulator whose output voltage is constant up to overload or short circuit. This regulator however upon occurrence of overload or short circuit continues to supply a current to its load but at a reduced current and voltage so that the regulator, the source therefor or load will not be injured. Upon cessation of the overload, the voltage regulator returns to normal operation without attention from an operator. This is accomplished by causing the current taken by the load to take over control of the series voltage control transistor when the current is above overload value. Furthermore, since the current operated control is fed by the voltage appearing across the load, the current fed to the load decreases during overload as the voltage of the load decreases.

---

This invention relates to a voltage regulator of the type including means to protect the load and to prevent damage to the regulator or to the power supply for the regulator upon occurrence of a short circuit in the load supplied by the regulator.

When a load supplied by a regulator develops a short circuit, the voltage across the output of the regulator drops towards zero, whereupon the regulator, in attempting to keep its output voltage at the high regulated value, decreases its internal impedance and thereby increases the flow of current to the load. This normal reaction of a voltage regulator to a short circuited load can result in severe damage to the power supply for the regulator or to the regulator or to the load or to all three. Regulators are known which shut themselves off, that is, present an open circuit to the load, upon occurence of a short circuit in the load supplied by the regulator. Such voltage regulators must be turned on again when the short circuit is cleared, requiring attention by an attendant. Other known regulators include means to shut the regulator off upon occurrence of a short circuited load and then to turn the regulator on periodically to test the duration of the short circuit, the regulator staying on only for a short interval if the circuit persists, whereby no damage results, the regulator remaining on however if the short circuit has been cleared. Such regulators are complicated and relatively expensive.

Regulators are also known which limit current to a fixed level, leading to excessive dissipation in the series element. Current limiters requiring a drop in output voltage to initiate operation are also known.

It is an object of this invention to provide an improved voltage regulator.

It is a further object of this invention to provide a voltage regulator which will not turn itself off when a short circuit occurs in its load and yet which includes means to reduce its output current to a safe value upon occurrence of an overload, the regulator returning to its normal manner of operation when the load returns to its normal range.

In accordance with the invention, the impedance of a series voltage regulating device is determined either by the comparison of a voltage which is a measure of the output voltage of the regulator with a standard voltage for all values of current flow through the regulator and to the load circuit that is below a predetermined value, or, the impedance of the regulating device is determined by the current flow to the load whenever the current flow is in excess of a predetermined amount. In this manner, flow of so much current to the load as would injure the voltage regulator or the source of power therefor or the load is prevented and yet the desired voltage will be applied by the regulator to the load when the current demanded by the load is below a damaging level.

Figure 1:
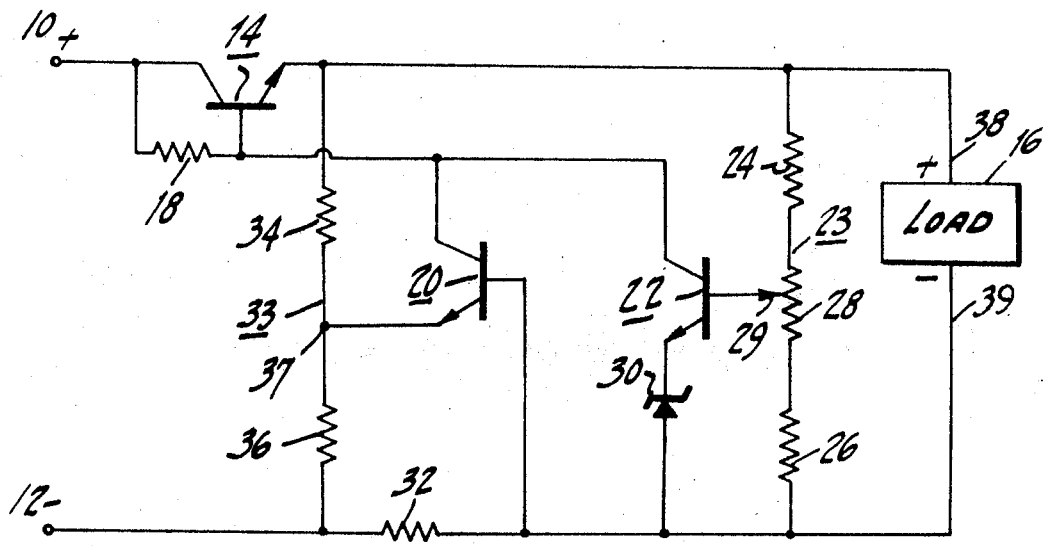
Figure 2:
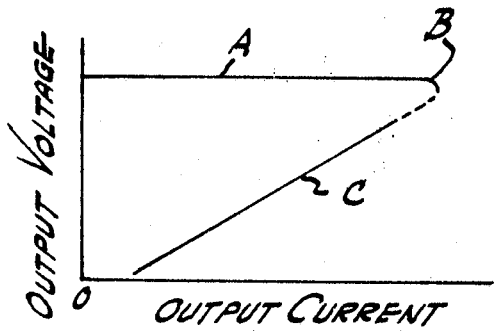

The invention will be better understood upon reading the following description in connection with the accompanying drawing in which FIGURE 1 is a circuit diagram of a voltage regulator according to this invention, and FIGURE 2 is a curve which is useful in explaining the operation of the voltage regulator of FIGURE 1.

Turning first to FIGURE 1, an unregulated direct current power supply (not shown) is connected between the terminals 10 and 12, the terminal 10 being positive. The collector of a series regulating impedance comprising a NPN transistor 14 is connected to the terminal 10 and the emitter of the transistor 14 is connected to a terminal of the load 16. The base of the transistor 14 is connected to the terminal 10 by way of a resistor 18. The base of the transistor 14 is also connected to the collectors of each of two additional NPN transistors 20 and 22. A voltage divider 23 comprising resistors 24 and 26 and an intervening potentiometer 28 having a slider 29 are connected in series across the load 16. The slider 29 is is connected to the base of the transistor 22, and the emitter of the transistor 22 is connected to the cathode of a Zener diode 30, the anode of the diode 30 being connected to the negative terminal 39 of the load 16 and to the negative terminal 12 of the unregulated source (not shown) through a current sensing resistor 32. A second voltage divider 33 comprising two series resistors 34 and 36 is connected between the positive terminal 38 of the load, and the negative terminal 12 of the unregulated source. The emitter of the transistor 20 is connected to the junction 37 of the resistors 34 and 36, and the base of the transistor 20 is connected to the negative load terminal 39.

The described voltage regulator operates as follows:

The load current will flow from the terminal 10, through the collector to emitter path of the transistor 14, through the load 16 and back to the terminal 12. Control current will flow from the terminal 10 through the resistor 18, through the collector to emitter path of the transistor 22, through the Zener diode 30 and back to the terminal 12. A voltage will be developed on the slider 29 of the potentiometer 28 which is a measure of the voltage across the load 16, and this slider voltage is applied to the base of the transistor 22. The current applied to the base of the transistor 14 through the resistor 18 is in such a direction as to make the transistor 14 conductive. The voltage developed across the Zener diode 30, which acts as a standard or comparison voltage, is in a direction to tend to render the transistor 22 non-conductive. The voltage developed across the resistor 26 and the lower portion as viewed in FIGURE 1 of the potentiometer 28 is in such a direction as to tend to render the transistor 22 conductive. The result of this combination of voltages applied to the transistor 22 is to so shunt current away from the base of the transistor 14, and thereby control the impedance of the transistor 14, as to keep the voltage between the slider 29 and the negative terminal of the load substantially constant, whereby the voltage across the load is kept substantially constant.

In the circuit so far described, if the voltage across the load decreases due to overload conditions, the voltage at the slider 29 also will decrease, whereby the conductivity of the transistor 22 will decrease and all of the current flowing in the resistor 18 will be applied to the base of the transistor 14 to saturate it, whereby its impedance is reduced to a low level in an attempt to keep the voltage across the load 16 constant. Such action of the described circuit would soon damage or destroy the transistor 14 or the source (not shown) or the load or all three. The current sensing resistor 32, the transistor 20, the voltage divider 33 and their connections are provided to prevent such possible damage to the described voltage regulator and source.

The resistor 36 applies a positive potential on the emitter of the transistor 20 tending to make it non-conductive. The voltage developed across the current sensing resistor 32 due to load current flowing therein is applied to the base of the transistor 20 in a direction to cause it to become conductive. The divider 33 and resistor 32 are so chosen that the transistor 20 remains non-conductive as long as the current flow through the load 16, as sampled by resistor 32 is of a predetermined rated value or lower. Therefore, when the current drawn by the load 16 is at or below the design limit, the transistor 20 draws no current and in fact, acts as if it were absent. When the current flow through the resistor 32 becomes great enough so that the voltage applied between the emitter and the base of the transistor 20 is sufficient to cause conduction thereof, the transistor 20 shunts current flowing through the resistor 18 from the base of the transistor 14 increasing the impedance of the transistor 14 and decreasing the voltage across the load 16 and therefore across each of the voltage dividers 23 and 33. The effect on the transistor 14 of the transistor 22, the Zener diode 30 and the voltage divider 23 is overcome by the transistor 20, whereby the current flowing through the resistor 32 and the voltage at the junction 37, rather than the voltage at the slider 29, controls the conduction of the transistor 14. Furthermore, since the voltage at the junction 37 (which is compared with the voltage across the resistor 32) decreases as the impedance of the transistor 14 increases, a progressively smaller current flow through the resistor 32 is sufficient to overcome the transistor 20 blocking voltage developed at the junction 37. Therefore, as the load impedance decreases a progressively smaller current flow through the resistor 32 is sufficient to increase the impedance of the transistor 14. This effect is illustrated in FIGURE 2.

Turning to FIGURE 2, as the output current increases from zero, the output voltage of the voltage regulator, which follows the portion A of the curve of FIGURE 2, remains almost constant until the point B corresponding to current overload is reached. During the portion A of the curve of FIGURE 2, the voltage regulating portion of the described circuit has control. If more current is demanded by the load, as when the load is short circuited, the output current and the output voltage follow the portion C of the curve, due to the operation of the overcurrent protecting portion of the circuit including the resistor 32, the transistor 20 and the voltage divider 33. It will be noted that during short circuit conditions, the current represented by the curve C is cut back whereby the regulator and its source and load are not damaged. Now, if the current demanded by the load becomes low enough so that the voltage developed across the resistor 36 is greater than the voltage developed across the resistor 32, the voltage regulating portion of the voltage regulator automatically assumes control again without the necessity of switching any part of the described circuit by an attendant and the regulator again provides a voltage regulated output.

Many variations of the described regulator will be evident to a person skilled in the art. For example, if it be desired that the terminal 10 be negative and the terminal 12 be positive, PNP transistors may be substituted for the NPN transistors shown in FIGURE 1 and the direction of the Zener diode may be reversed. Transistor 14 may be replaced by multiple units for greater current and power capability. The function of transistor 22 may be accomplished by an amplifier containing many transistors, etc. The description is therefore to be taken as illustrative and not in a limiting sense.

What is claimed is:
1. A current limiting voltage regulator comprising:
   a first, second and third transistor each having a pair of main electrodes including a collector and an emitter electrode, and a control electrode,
   a connection from a first terminal of an unregulated source to one main electrode of said first transistor,
   a connection from a first terminal of a load to the other main electrode of the first transistor,
   a resistor connected between said first terminal of said source and the control electrode of said first transistor,
   a connection including a current sensing resistor between another terminal of said source and of said load,
   a first and a second voltage divider,
   means for connecting said first voltage divider across the terminals of said source in series with the main electrodes of said first transistor,
   means for connecting said second voltage divider across the terminals of said load,
   means for connecting the collectors of said second and third transistors to the base of said first transistor,
   means for connecting the emitter of said second transistor to a point on said first voltage divider,
   means for connecting the base of said second transistor to the other terminal of said source through said current sensing resistor,
   a voltage standard means having two electrodes,
   means for connecting one electrode of said voltage standard means solely to the emitter of said third transistor,
   means for connecting the other electrode of said voltage standard means to said other terminal of said load, and
   means to connect the base of said third transistor to a point on said second voltage divider.

References Cited

UNITED STATES PATENTS 3,109,980 11/1963 Wiley _____ 317—22 X
3,284,692 11/1966 Gautherin.
3,373,341 3/1968 Wattson _____ 323—9

FOREIGN PATENTS 940,784 11/1963 Great Britain.

JOHN F. COUCH, *Primary Examiner.*

A. D. PELLINEN, *Assistant Examiner.*

U.S. Cl. X.R.

323—22, 38; 317—33